(No Model.)

J. G. WEATHERLY.
FISH HOOK.

No. 326,816. Patented Sept. 22, 1885.

Witnesses:
P. E. Grant
G. E. Tucker

Inventor:
Jared Groce Weatherly
by his Attorneys
Johnson and Johnson

United States Patent Office.

JARED GROCE WEATHERLY, OF TECUMSEH, ALABAMA.

FISH-HOOK.

SPECIFICATION forming part of Letters Patent No. 326,816, dated September 22, 1885.

Application filed July 16, 1885. (No model.)

*To all whom it may concern:*

Be it known that I, JARED GROCE WEATHERLY, a citizen of the United States, residing at Tecumseh, in the county of Cherokee and State of Alabama, have invented new and useful Improvements in Fish-Hooks, of which the following is a specification.

My invention relates to the class of fish-hooks which are designed to provide against the possible shaking out of the hook after the bait is taken or the tearing of the flesh in certain kinds of fish.

The object of my invention is to provide a construction of fish-hook of this kind that will grapple any fish which avoids the hold of the hook, whether it be large or small. This I accomplish by an improved construction, hereinafter described, wherein the barbed hooks are drawn to their work, whether the resisting power of the fish be powerful or weak.

Figure 1:
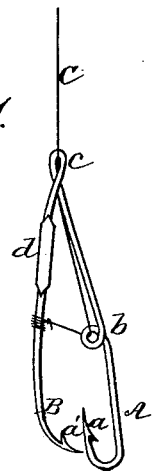
Figure 2:
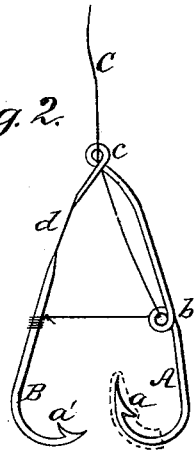
Figure 3:
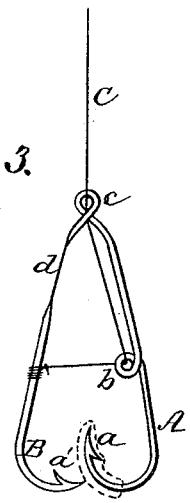

Figure 1 represents my improved fish-hook in perspective; Fig. 2, a side view of the hook, and Fig. 3 shows the hook with its stabbing barbed spring-arm as drawn in to hold the fish.

Looking at the drawings, A represents the bait-arm of the hook, and B the stabbing grip-arm. Both arms have barbs $a$ $a'$, but the barb $a'$ of the arm B is only for the purpose of hooking into the fish's nose, by means presently described, while the other arm, A, carries the bait. The arm A has an eye, $b$, about midway its length, and, preferably, the two arms being of a single piece of steel-wire, the eye $c$ for the line is made by twisting, just as the eye $b$ is also made. Near the top of the arm B it is flattened, as at $d$, to form a spring.

Skilled mechanics would readily understand from the above description and accompanying drawings how to make such a fish-hook.

The fishing-line C passes through the eye $c$ at the top of the hook down to the eye $b$ of the arm A, which carries the bait, thence crossing to the arm B, to which it is properly secured. The fish having taken the bait, the angler, in drawing in, causes the arm B to grip upon and stick into the nose of the fish, so that the fish may neither be lost by the shaking out of the hook nor by the tearing of the soft flesh. The arm B has its integral spring, and the whole hook is of a single piece.

I claim—

1. A fish-hook having two barbed arms, one supported by means of a flattened integral spring portion, and adapted to be actuated by the angler's line, substantially as described.

2. A fish-hook of this construction, to wit: a single metallic piece with barbed ends twisted to form an eye, $c$, for the line, and to provide two arms, A and B, one of which shall be flattened near its top to give it resiliency, while the other has an eye, $b$, and carries the bait, in combination with the fishing-line, substantially as and in the manner set forth.

In testimony whereof I have hereunto set my hand in the presence of two subscribing witnesses.

JARED GROCE WEATHERLY.

Witnesses:
 P. SHERIDAN,
 ISAAC MORRISON.